Jan. 16, 1962
J. F. DEWALD ETAL
3,017,548
SIGNAL TRANSLATING DEVICE
Filed Jan. 20, 1958
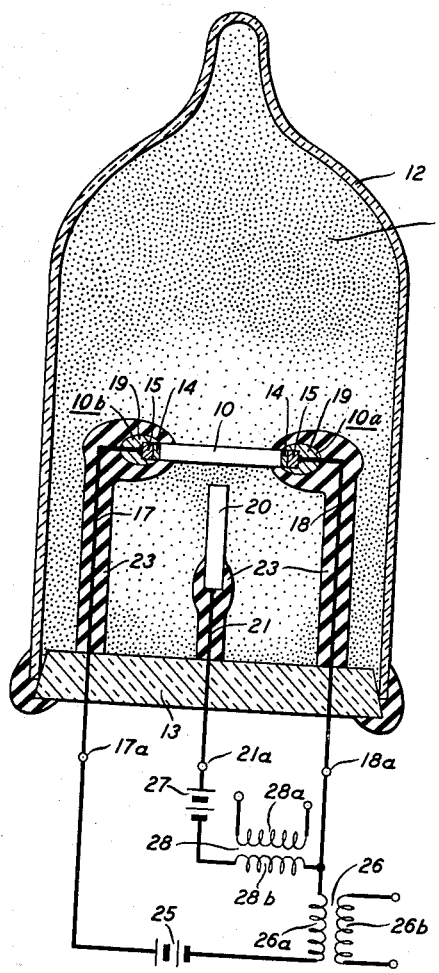
INVENTORS J. F. DEWALD
J. J. LANDER
BY Lucien C. Canepa
ATTORNEY

United States Patent Office 3,017,548
Patented Jan. 16, 1962

3,017,548
SIGNAL TRANSLATING DEVICE
Jacob F. Dewald, Mendham, and James J. Lander, Watchung, N.J., assignors to Bell Telephone Laboratories, Incorporated, New York, N.Y., a corporation of New York
Filed Jan. 20, 1958, Ser. No. 709,931
8 Claims. (Cl. 317—231)

This invention relates to signal translating semiconductor devices, and more particularly to such devices of the field-effect type.

The basic principles of operation of field-effect devices are well-known (reference may be made, for example, to Electrons and Holes in Semiconductors, W. Shockley, 1950, New York, Van Nostrand Company, pp. 29f). For that reason, these principles will not be discussed in detail herein. Briefly then, the operation of such devices depends essentially on the following phenomenon: The application of an electric field normal to the surface of a semiconductive material induces in the material an electric charge near its surface. If this charge corresponds to the addition or removal of current carriers in the semiconductor, then the conductivity of the material is altered and the applied field can thereby modulate the flow of current through the semiconductive material.

The attainment of amplification in field-effect devices depends primarily on the modulating or normal field not inducing a large current flow across the semiconductive surface and, further, on a substantial portion of the modulating field extending into the semiconductive material.

An object of the present invention is an improved signal translating device.

More specifically, an object of this invention is an improved amplifying device of the field-effect type.

Another object of the present invention is an amplifying device in which a relatively small voltage is capable of causing a relatively large conductivity modulation of a current-carrying member.

These and other objects of the present invention are realized in a specific illustrative embodiment thereof wherein an n-type semiconductive monocrystalline member of zinc oxide, having current-carrying connections of low resistivity secured to the ends thereof, is arranged in contact with an electrolytic medium, thereby forming in the embodiment a rectifying barrier. The application (under proper bias conditions) of a signal voltage between the electrolyte and the semiconductive material then acts to modulate the flow of a load current through the material.

In particular, in a device of this kind, in contradistinction to prior art forms of field-effect devices, the efficiency of the conductivity modulation process is enhanced by the choice of an appropriate semiconductive material and by a mode of operation in which the rectifying barrier provided in the device is biased partly in the forward direction and partly in the reverse direction.

Thus, a feature of the present invention is a signal translating device comprising a member of zinc oxide, means for passing a current through the member, an electrolyte in contact with portions of the surface of the zinc oxide member, an electrode in contact with the electrolyte, and potential means connected between the electrode and the member, whereby the potential means may be employed to modulate the current through the zinc oxide member.

In accordance with aspects of the present invention, there is provided a translating device of the field-effect type in which a high-energy-gap semiconductive material is employed. (In this application, the term "high-energy-gap" will be taken to refer to those materials in which an energy of two electron volts or more is required to transfer an electron from the valence to the conduction band. Thus, germanium and silicon, with energy gaps of about 0.7 electron volt and 1.1 electron volts, respectively, would by this definition be considered to be relatively low-energy-gap materials.) A typical high-energy-gap material is zinc oxide, which is characterized by an energy gap of about 3.3 electron volts. Other high-energy-gap semiconductive materials include diamond (C), cadmium sulfide (CdS), and tantalum oxide ($Ta_2O_5$).

The invention will be understood more clearly and fully from the following detailed description in conjunction with the accompanying drawing which is a schematic representation of a signal translating system including as a component part thereof a specific illustrative embodiment made in accordance with the principles of the present invention.

The drawing1 shows a crystal 10 of zinc oxide mounted in an electrolyte 11 which is contained by a vessel 12 and a base element 13.

Advantageously, the ends of the crystal 10 are first respectively plated with layers of indium 14 and then with layers of copper 15. To each of these low-resistance connections, there is then soldered (reference numerals 19 designate blobs of solder) a mechanically stiff electrical conductor. (It is noted that the ends 10a and 10b of the crystal 10 may be respectively characterized as the source and drain terminals thereof.)

The crystal-supporting conductors 17 and 18 are securely mounted in the base 13 and extend below it to provide terminal portions 17a and 18a to which electrical connections may be made.

Also supported in the electrolytic medium 11 is an electrode or gate 20. The gate 20 has connected to it the conductor 21 (having a bottom terminal portion 21a) which, like the conductors 17 and 18, is securely mounted in the base 13.

The portions of the supporting conductors 17, 18 and 21 within the vessel 12 are insulated electrically from the electrolytic substance 11 by a coating of a suitable material 23. The same material 23 may also advantageously be employed to seal the joints between the vessel 12 and the base 13, thereby providing an evaporation-proof enclosure for the electrolyte 11.

The gate 20, which may be formed of any noble metal, is advantageously of platinized platinum. The vessel 12 may be of glass, and the base 13 of any suitable unreactive insulating material.

The monocrystalline zinc oxide out of which the member 10 is made may, for example, be formed in the following manner: A quantity of zinc is vaporized by heating the metal to approximately 600 degrees centigrade. The vaporized zinc is then carried by a mixture of nitrogen and hydrogen gases to a pure alumina furnace or reaction zone in which the carried vapor is heated to a temperature of 1200–1300 degrees centigrade in an oxygen atmosphere, thereby to form a zinc oxide crystal.

Turning again to the drawing, there is shown a source of potential 25 and a primary coil 26a of an output transformer 26. These series-related elements are connected to the elements 17a and 18a which, as described above, extend respectively to the ends of the zinc oxide crystal 10.

The elements 10, 25 and 26a comprise a work circuit, the current through which may be modulated by a control circuit including the gate 20, a source of potential 27, and a secondary coil 28b of an input transformer 28. The application of a signal voltage to the primary coil 28a of the input transformer 28 modulates the conductivity of the crystal 10 in the work or output circuit. In this manner the current through the primary coil 26a (and thus through the secondary element 26b of the output assembly 26) is varied in correspondence with the input wave form.

Illustrative devices made in accordance with the principles of this invention advantageously include as the electrolytes thereof water solutions of "indifferent" salts, that is, salts which are at least as difficult to reduce or oxidize at the surface of the high-energy-gap semiconductive material as is water. Examples of such salts are sodium sulfate, potassium chloride and sodium tetraborate.

Additionally, these electrolytic solutions are advantageously characterized by relatively high conductivity. For our purposes here, a relatively high conductivity solution refers to one having a conductivity in excess of about one ohm$^{-1}$ cm.$^{-1}$.

The embodiment depicted in the drawing shows the potential supply 27 arranged in what will be called the cathodic bias condition. In this condition, the right-hand side of the crystal 10 is negatively biased with respect to the electrode or gate 20, while the left-hand side is positively biased with respect to the gate 20. By analogy to the biasing of a p-n junction, the right-hand side of the crystal 10 may also be said to be arranged in a forward bias condition. The left-hand side of the crystal is then in a state of reverse bias.

It might be expected that this arrangement (cathodic or forward bias) would give rise to an appreciable current flow across the crystal-to-electrolyte interface for low voltage values of the supply 27. This, however, is not so for voltage values of one or less if a high-energy-gap semiconductive crystal is employed, and, further, if the electrolyte contains no species which are more easily reducible at the crystal surface than are the hydrogen ions of the electrolyte 11.

If the two above-noted conditions are met, there may be applied to the crystal-to-electrolyte interface a cathodic bias of up to one volt without causing any appreciable current flow across the interface or rectifying junction. The significance of this is that a bias voltage of one volt sets up a very large electric field at the surface of the semiconductive material. More specifically, one volt applied to a zinc oxide-to-electrolyte interface system of the type herein-described produces at the surface of the zinc oxide a field approaching $10^7$ volts per centimeter.

The significance of such a large field (without current flow) to the problem of conductivity modulation is apparent when one performs a simple computation. Assume a plate crystal 0.001 centimeter thick with a carrier density of $10^{14}$ electrons per cubic centimeter. There are then $10^{11}$ electrons per square centimeter in the entire crystal. If one applies just one volt to the crystal-to-electrolyte interface, a field of the order of $10^7$ volts per centimeter results, and a charge of about $1000 \times 10^{11}$ electrons per square centimeter is introduced at the surface of the semiconductive material. Thus, if all the introduced charge is characterized by normal bulk mobility, it is seen that the applied bias voltage will cause a 1000 fold increase in conductivity in the semiconductive crystal.

It is to be understood that the above-described arrangements are illustrative and not restrictive of the principles of the invention. Other arrangements may be devised by those skilled in the art without departing from the spirit and scope of the invention. For example, although emphasis has been directed above to a preferred configuration wherein the electrode in contact with the electrolyte is biased positively (cathodic or forward bias) with respect to the source terminal of the semiconductive body, it is to be understood that a configuration wherein the electrode is biased negatively (anodic or reverse bias) with respect to the source terminal of the semiconductive crystal may also be arranged in a signal translating circuit to provide conductivity modulation of the crystal member.

Additionally, although the specific illustrative device described above is shown connected in an alternating current translating circuit, it is to be understood that a device made in accordance with the principles of the present invention is also well-suited for employment as a direct current translating device.

Furthermore, the principles of the present invention encompass a translating device having the conductivity modulatable portion thereof formed of a high-energy-gap p-type semiconductive material, for example, cadmium sulfide (CdS). An illustrative preferred system including such a material would appear like that shown in the drawing, except that the potential sources 25 and 27 shown therein would be respectively reversed in polarity.

What is claimed is:

1. A signal translating device comprising a high energy gap semiconductive member, said member being characterized by a uniform type of conductivity, a relatively high conductivity electrolyte in contact with a portion of the surface of said member, an input electrode in contact with said electrolyte, and conductive leads adapted to be connected to a work circuit so that the working current may flow through said semiconductive member.

2. A device as in claim 1 wherein said semiconductive member comprises monocrystalline zinc oxide.

3. In combination, a circuit element comprising a high energy gap semiconductive material of a uniform conductivity type, spaced electrodes making contact to separate portions of said element, a relatively highly conductive electrolyte making a rectifying connection to the surface of said element intermediate said separate portions, and an electrode in contact with said electrolyte.

4. A combination as in claim 3 wherein said semiconductive member comprises monocrystalline zinc oxide.

5. In combination in a signal translating device, a semiconductive member comprising a high energy gap material of a uniform conductivity type, an electrolyte in contact with the surface of said member, said electrolyte comprising a water solution of an indifferent salt, and means to be connected to input and output circuits respectively whereby a potential may be established between said electrolyte and said member and a current flow may be directed through said member.

6. A signal translating device including a member having an extended region comprising a high energy gap semiconductive material, said region being characterized by a uniform type of conductivity, an electrolyte of relatively high conductivity making rectifying contact with the surface of said region, an input electrode in contact with said electrolyte, and conductive means to be connected to a work circuit for directing a current flow through said region.

7. A field effect transistor comprising a housing, an electrolyte of relatively high conductivity substantially filling said housing, a filamentary member of a high energy gap material of uniform conductivity-type immersed in said electrolyte, the surface of the intermediate portion of the member being exposed to said electrolyte and making rectifying contact therewith and the surface of each of the opposite end portions of the member being insulated from said electrolyte, an electrode for applying input signals immersed in said electrolyte and making electrical connection thereto and a pair of electrodes connected electrically to opposite end portions of the member and electrically insulated from the electrolyte.

8. The field effect transistor in accordance with claim 7 in which the member is monocrystalline zinc oxide and the electrolyte is a water solution of an indifferent salt.

References Cited in the file of this patent

UNITED STATES PATENTS

| | | |
|---|---|---|
| 1,745,175 | Lilienfeld | Jan. 28, 1930 |
| 1,900,018 | Lilienfeld | Mar. 7, 1933 |
| 1,948,864 | Mershon | Feb. 27, 1934 |
| 2,208,455 | Glaser | July 16, 1940 |
| 2,524,033 | Bardeen | Oct. 3, 1950 |
| 2,524,034 | Brattain et al. | Oct. 3, 1950 |
| 2,569,347 | Shockley | Sept. 25, 1951 |
| 2,836,797 | Ozarow | May 27, 1958 |
| 2,870,344 | Brattain | Jan. 20, 1959 |

FOREIGN PATENTS

| | | |
|---|---|---|
| 683,817 | Great Britain | Dec. 3, 1952 |